US007757173B2

(12) United States Patent
Beaman (10) Patent No.: US 7,757,173 B2
(45) Date of Patent: Jul. 13, 2010

(54) VOICE MENU SYSTEM

(75) Inventor: Alexander B. Beaman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1370 days.

(21) Appl. No.: 10/623,339

(22) Filed: Jul. 18, 2003

(65) Prior Publication Data

US 2005/0015254 A1    Jan. 20, 2005

(51) Int. Cl.
*G06F 3/16* (2006.01)
*G06F 3/14* (2006.01)

(52) U.S. Cl. .................... 715/727; 715/728; 345/173

(58) Field of Classification Search ................ 704/270; 715/727–728; 345/173
See application file for complete search history.

(56) References Cited

U.S. PATENT DOCUMENTS

| | | | |
|---|---|---|---|
| 5,296,642 A * | 3/1994 | Konishi ................... 84/609 |
| 5,661,787 A * | 8/1997 | Pocock ................. 379/101.01 |
| 5,721,827 A | 2/1998 | Logan et al. |
| 5,802,526 A * | 9/1998 | Fawcett et al. ........... 707/104.1 |
| 5,890,122 A * | 3/1999 | Van Kleeck et al. ......... 704/275 |
| 5,912,952 A * | 6/1999 | Brendzel ................ 379/93.25 |
| 5,950,123 A * | 9/1999 | Schwelb et al. .......... 455/414.4 |
| 5,999,895 A * | 12/1999 | Forest ....................... 704/1 |
| 6,360,237 B1 * | 3/2002 | Schulz et al. ............... 715/531 |
| 6,448,485 B1 * | 9/2002 | Barile ....................... 84/609 |
| 6,493,428 B1 * | 12/2002 | Hillier ..................... 379/67.1 |
| 6,519,566 B1 * | 2/2003 | Boyer et al. ............... 704/275 |
| 6,556,971 B1 | 4/2003 | Rigsby et al. |
| 6,563,769 B1 * | 5/2003 | Van Der Meulen ....... 369/30.06 |
| 6,728,729 B1 | 4/2004 | Jawa et al. |
| 6,731,312 B2 | 5/2004 | Robbin |
| 6,754,504 B1 * | 6/2004 | Reed ....................... 455/517 |
| 6,978,127 B1 * | 12/2005 | Bulthuis et al. ............ 455/412.1 |
| 6,983,251 B1 * | 1/2006 | Umemoto et al. ........... 704/270 |
| 6,999,066 B2 * | 2/2006 | Litwiller .................... 345/173 |

(Continued)

FOREIGN PATENT DOCUMENTS

EP    0 981 236 A1    2/2000

(Continued)

OTHER PUBLICATIONS

"*Graphical User Interface and Methods of Use Thereof in a Multimedia Player*", U.S. Appl. No. 10/282,861, filed Oct. 28, 2002; Inventors: Jeffrey L. Robbin et al.

(Continued)

*Primary Examiner*—Steven B Theriault
(74) *Attorney, Agent, or Firm*—Beyer Law Group LLP (57) ABSTRACT

A voice menu system is disclosed. The present invention generally allows for updateable audio menus. Although a device might have some pre-packaged menu components, other menu components can be received from a server. Each menu component, regardless of whether it is original or received from the server, has an associated voiced name. When a user highlights a menu choice, the voiced name can be played. The user then has the option of selecting the menu choice or scrolling to a new menu choice. In this way, a user could navigate the menu without having to actually see a visual display of the menu, which may be especially useful for users unable to see the visual display or users with visual disabilities.

24 Claims, 7 Drawing Sheets

U.S. PATENT DOCUMENTS

| | | | |
|---|---|---|---|
| 7,010,581 B2* | 3/2006 | Brown et al. | 709/218 |
| 7,027,990 B2* | 4/2006 | Sussman | 704/270.1 |
| 7,028,252 B1* | 4/2006 | Baru et al. | 715/500.1 |
| 7,054,888 B2* | 5/2006 | LaChapelle et al. | 707/104.1 |
| 7,085,960 B2* | 8/2006 | Bouat et al. | 714/13 |
| 7,149,319 B2* | 12/2006 | Roeck | 381/314 |
| 7,216,008 B2* | 5/2007 | Sakata | 700/94 |
| 2002/0002039 A1* | 1/2002 | Qureshey et al. | 455/344 |
| 2002/0013784 A1* | 1/2002 | Swanson | 707/104.1 |
| 2002/0013852 A1* | 1/2002 | Janik | 709/231 |
| 2002/0045438 A1* | 4/2002 | Tagawa et al. | 455/412 |
| 2002/0046315 A1* | 4/2002 | Miller et al. | 711/1 |
| 2002/0143533 A1* | 10/2002 | Lucas et al. | 704/235 |
| 2003/0051136 A1* | 3/2003 | Curtis et al. | 713/163 |
| 2003/0074198 A1 | 4/2003 | Sussman | |
| 2003/0079038 A1 | 4/2003 | Robbin et al. | |
| 2003/0098892 A1* | 5/2003 | Hiipakka | 345/846 |
| 2003/0158737 A1* | 8/2003 | Csicsatka | 704/273 |
| 2003/0167318 A1 | 9/2003 | Robbin et al. | |
| 2003/0197744 A1* | 10/2003 | Irvine | 345/856 |
| 2004/0055446 A1* | 3/2004 | Robbin et al. | 84/615 |
| 2004/0078382 A1* | 4/2004 | Mercer et al. | 707/102 |
| 2004/0127241 A1* | 7/2004 | Shostak | 455/500 |
| 2004/0218451 A1* | 11/2004 | Said et al. | 365/222 |
| 2005/0045373 A1* | 3/2005 | Born | 174/254 |
| 2005/0149214 A1* | 7/2005 | Yoo et al. | 700/94 |
| 2006/0235550 A1* | 10/2006 | Csicsatka et al. | 700/94 |
| 2007/0026852 A1* | 2/2007 | Logan et al. | 455/422.1 |
| 2007/0089132 A1* | 4/2007 | Qureshey et al. | 725/39 |
| 2007/0089135 A1* | 4/2007 | Qureshey et al. | 725/45 |

FOREIGN PATENT DOCUMENTS

| | | |
|---|---|---|
| EP | 1 311 102 | 5/2003 |
| EP | 1 311 102 A1 | 5/2003 |
| NL | 1 014 847 C1 | 8/2001 |
| NL | 1 014 847 C1 | 10/2001 |
| WO | WO 01/30046 * | 4/2001 |

OTHER PUBLICATIONS

Partial International Search Report and Invitation to Pay Additional Fees mailed Aug. 4, 2005 for corresponding PCT application, International Application No. PCT/US2004/016519.

International Search Report and Written Opinion mailed Nov. 3, 2005 for corresponding PCT application, International Application No. PCT/US2004/016519.

Mobile Speech Solutions, Mobile Accessibility, Product Information Sheet, SVOX AG, at http://www.svox.com/si te/bra840604/con782768/mob965831936.asp?osLang=1.

Anhui USTC iFLYTEK Co., Ltd., Information Datasheet, at http://www.iflytek.com/english/Research.htm, pp. 1-3.

Office Action from corresponding EP Application No. 04 753 362.5 dated Nov. 14, 2006.

Macsimum News- "Apple files patent for an audio interface for the iPod," downloaded from http://www.macsimumnews.com/index.php/archive/apple_files_patent_for_an_audio_interface_for_the_ipod/, posted May 4, 2006.

"Apple patents audio user interface- Engadget," downloaded from http://www.engadget.com/2006/05/04/apple-patents-audio-user-interface/ posted May 4, 2006.

"Phatnoise" downloaded from http://www.phatnoise.com/kenwood/kenwoodssamail.html on Jul. 13, 2006.

Office Action from Chinese Application No. 200480026208.5 dated May 25, 2007.

"Experiencing Amazement from Windows XP," New Computer, Issue 2, 2002, Feb. 28, 2002.

"Digital Audio in the New Era," Electronic Design and Application, Issue 6, 2003, Jun. 30, 2003.

Office Action dated May 26, 2008 in EP Application No. 04 753 362.5.

Chinese Office Action from Chinese Patent Application No. 200480026208.5 dated Feb. 6, 2009.

Chinese Office Action from Chinese Patent Application No. 200480026208.5 dated Oct. 9, 2009.

European Office Action dated May 11, 2010 from European Patent Application No. 04 753 362.5.

* cited by examiner

VOICE MENU SYSTEM

BACKGROUND OF THE INVENTION

1. Field of the Invention

The present invention relates to media players and, more particularly, to navigating menus of media players.

2. Description of the Related Art

The ability of computers to be able to share information is of utmost importance in the information age. Networks are the mechanism by which computers are able to communicate with one another. Generally, devices that provide resources are called servers and devices that utilize those resources are called clients. Depending upon the type of network, a device might be dedicated to one type of task or might act as both a client and a server, depending upon whether it is giving or requesting resources.

Increasingly, the types of resources that people want to share are often entertainment-related. Specifically, music, movies, pictures, and print are all types of entertainment-related media that someone might want to access from across a network. For example, although a music library may reside on a desktop computer, the media owner may want to listen to the music on a portable media player.

In order to achieve portability, many portable media players use minimalist displays that allow the user access to the music via simple graphical user interfaces. The displays are not always well-lit, and may not be navigable in the dark. Also, the user may be in certain situations (e.g., driving a car) where it is not convenient or appropriate to look at the display, or may have a physical disability that makes visually navigating the menu impossible. Additionally, many people may simply find the displays too small and inconvenient to use on a regular basis.

Although the described technologies work well in many applications, there are continuing efforts to further improve the user experience.

SUMMARY OF THE INVENTION

The present invention provides a method for providing an audio menu. First, text strings are provided on a server, each text string being capable of representing a menu choice. Next, audio files are generated, each audio file representing a voiced name of one of the text strings, and each audio file is associated with its text string. The server then delivers both the audio files and the associations to a client.

A menu is subsequently presented on the client that includes menu choices represented by the text strings, the menu choices being capable of being highlighted or selected. The audio files are played on the client when their associated menu choices are highlighted.

In another aspect of the invention, a server that includes a processor, memory and a network interface is provided. The server's processor is operable to perform instructions including providing a text string that represents a menu component, whereby the menu component is one of several options that can be selected from a menu on a client device. The server's processor is also operable to perform other instructions such as generating an audio file that is an audio representation of the menu component and delivering the audio files to a client device.

In yet another aspect of the invention, a client device that includes a processor, memory and a network interface is provided. The client's processor is operable to perform instructions including allowing it to receive an audio file from a server that is an audio representation of a menu component, whereby the menu component is one of several options that can be selected from a menu. The client's processor is also operable to perform instructions that include allowing it to update the menu to include the menu component and playing the audio file when the menu component is highlighted.

In yet another aspect of the invention, a media management system is provided. The media management system includes a media database, media collection records, media records, a voiced names database and string association records. The media database stores media files. The media collection records include data relating to groupings of the media files. The media records include metadata relating to the media files. The voiced names database stores audio files. The string association records associate the audio files with data from the media collection records and metadata from the media records.

BRIEF DESCRIPTION OF THE DRAWINGS

The invention may best be understood by reference to the following description taken in conjunction with the accompanying drawings in which.

It is to be understood that, in the drawings, like reference numerals designate like structural elements. Also, it is understood that the depictions in the figures are not necessarily to scale.

DETAILED DESCRIPTION OF THE PREFERRED EMBODIMENTS

In the following description, numerous specific details are set forth to provide a thorough understanding of the present invention. However, it will be obvious to one skilled in the art that the present invention may be practiced without some or all of these specific details. In other instances, well known process steps have not been described in detail in order to avoid unnecessarily obscuring the present invention.

The present invention generally allows for updateable audio menus. Although a device might have some pre-packaged menu components, other menu components are received from a server. For example, a music player might come with some pre-installed menu components (e.g., a top menu level of "Playlists," "Songs," "Artists," "Settings," and "About") but allow other menu components to be added to the various menu choices (e.g., a user-added top level menu of "Genre" or the second level menu listing of available playlists, songs, and artists). Each menu component, regardless of whether it is original or received from the server, has an associated voiced name. When the user highlights a menu choice, the voiced name is played. The user then has the option of selecting the menu choice or scrolling to a new menu choice. In this way, a user could navigate the menu without having to see the visual display.

Figure 1:
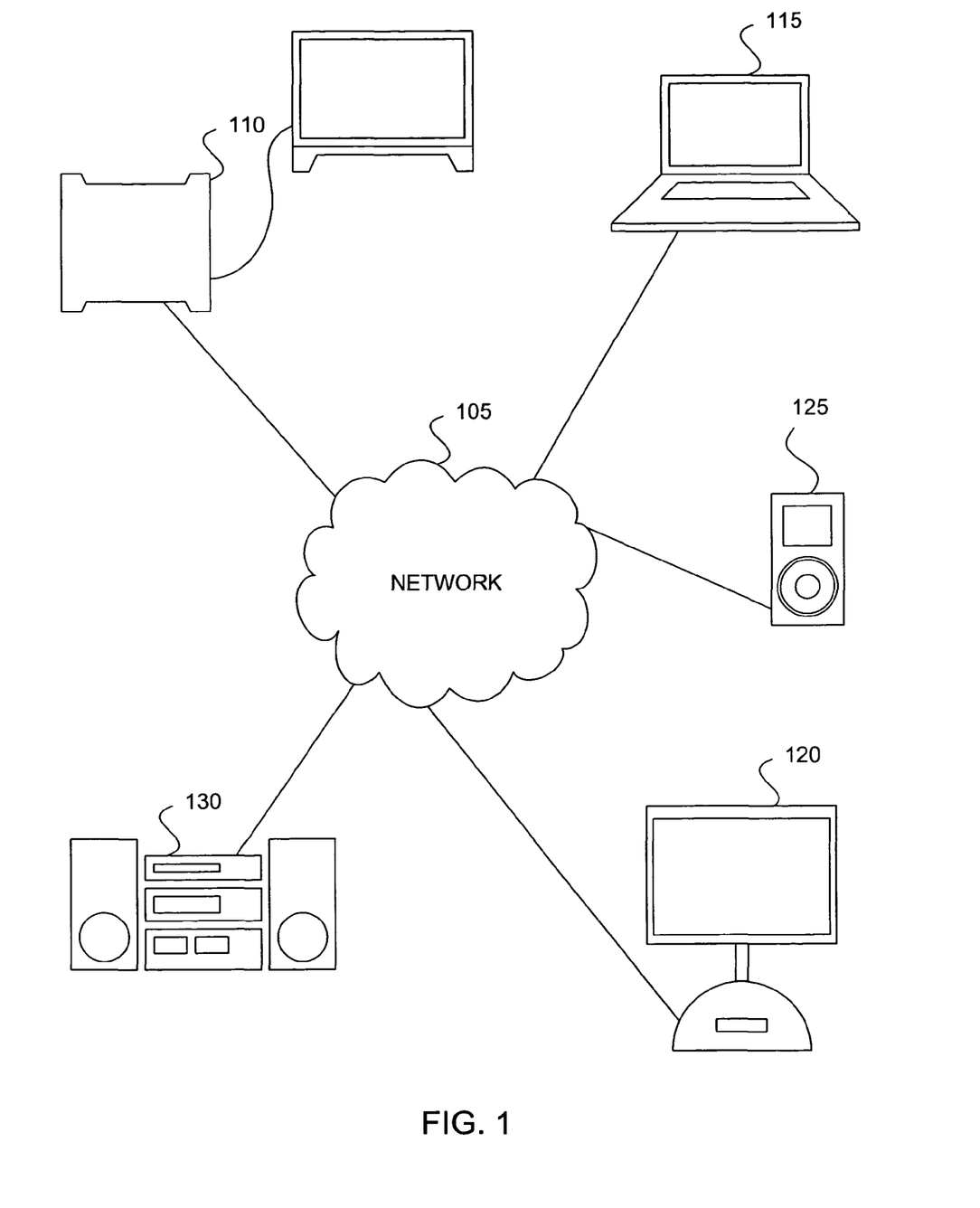
FIG. 1 is a block diagram illustrating an exemplary environment in which the present invention may be implemented.

FIG. 1 is a block diagram illustrating an exemplary environment in which the present invention may be implemented. A network 105 couples a server 110 to various clients 115, 120, 125, and 130. The network 105 can generally be a data network, such as a LAN, WAN or the Internet. The server 110 may or may not be a dedicated device. In the example shown in FIG. 1, the server 110 is a general purpose computer. The various clients 115, 120, 125, and 130 can be thick or thin clients, with varying levels of processing power. Clients may include portable computers 115, desktop computers 120, specialized devices such as iPods™ 125 available from Apple Computer, Inc. of Cupertino, Calif., or even network-aware audio/video components 130 that are designed to work across the network 105. Certain devices, such as the iPod 125, might directly connect to the server 110 via FireWire, USB, or some other external bus that allows the client 125 and the server 110 to be more directly networked together.

Figure 2:
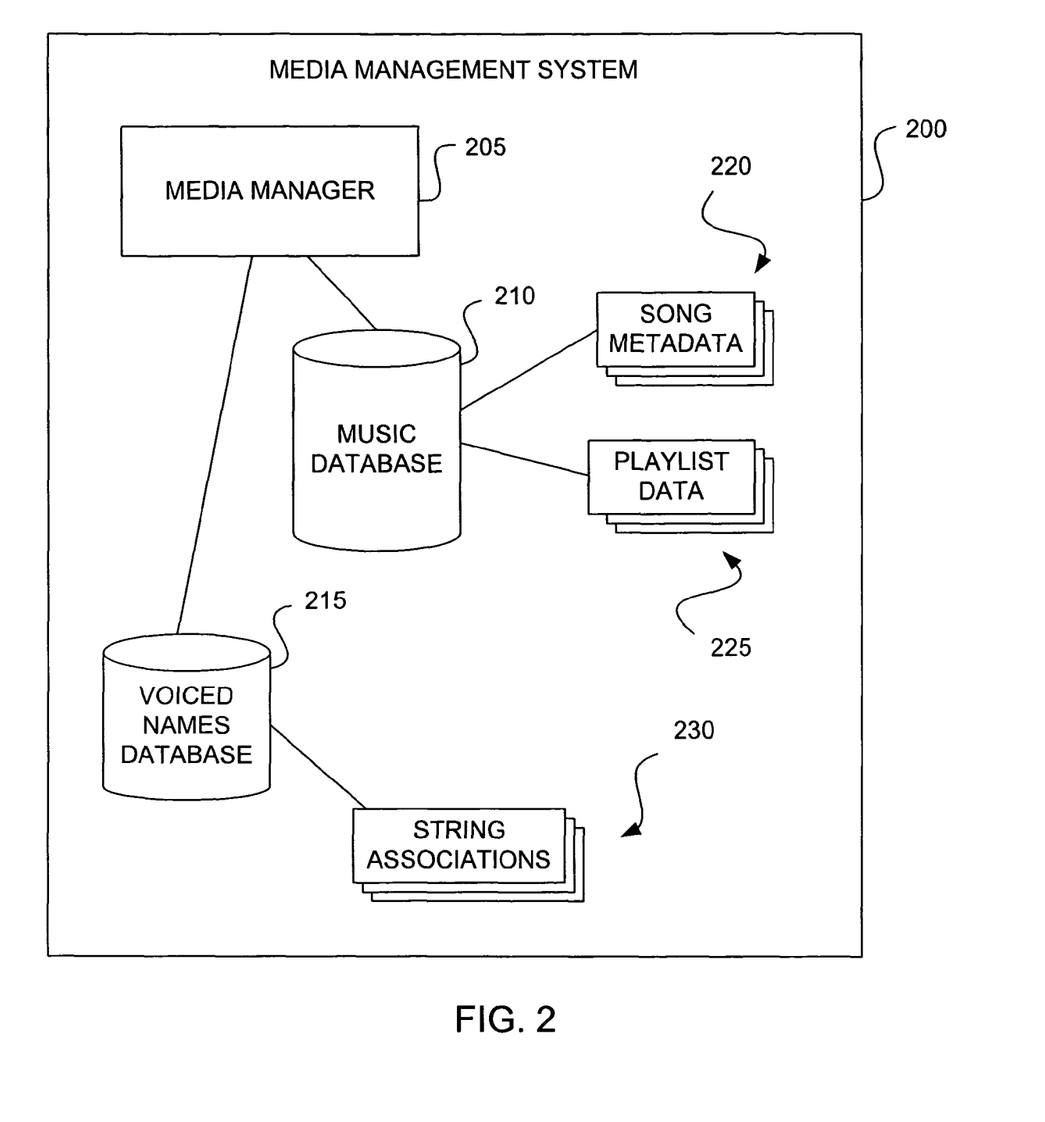
FIG. 2 is a block diagram illustrating an organizational structure of a media management system according to one embodiment of the invention.

FIG. 2 is a block diagram illustrating an organizational structure of a media management system 200 according to one embodiment of the invention. The media management system 200 is the computer program that allows the user to both organize and access digital media. For simplicity, the following discussion will assume the digital media is limited to music. It should, however, be appreciated that any reference to "songs" or "music" could be generalized to any form of digital media, which can include sound files, picture data, movies, text files or any other types of media that can be digitally stored on a computer. Similarly, any reference to "playlists" can be generalized to media collections, including collections of mixed digital media.

Although the server 110 and the clients 115, 120, 125, and 130 might each have different versions of the media management system 200 that are specially tailored to the specific functionality required from those devices, the basic components of the media management system 200 are similar. Specifically, the media management system 200 can include a media manager 205, a music database 210, and a voiced names database 215. The media manager 205 manages the databases 210 and 215.

The music database 210 has a number of song records 220 and playlist records 225 that are used to classify, identify and/or describe media (i.e., media items) in the music database 210. The song records 220 contain metadata about each media item available in the database 210. The metadata might include, for example, the names of songs, the artist, the album, the size of the song, the format of the song, and any other appropriate information. Of course, the type of information may depend on the type of media. A video file might additionally have director and producer fields, but may not use the album field.

The playlist records 225 contain information about each playlist available in the music database 210. Further, the information for a given playlist can include identifying information for each of the songs within the playlist. Playlists are collections of media that may or may not be in any particular order. Users may choose to combine media by genre, mood, artists, audience, or any other meaningful arrangement.

Some of the information contained in the various records 220, 225, and 230 are used as menu components. For example, a top level of menu components might permit the user to navigate through "Songs," "Artists," or "Playlists." These classifications could either be pre-packaged with the media management system 200, or modified by the user if the media management system 200 permits modification. The user would then be able to navigate to a specific media through several different routes.

For example, if the user wanted to access the song "Little Angel of Mine" through the "Songs" menu component, the user would scroll through the top level choices until the "Songs" menu component was highlighted. Once highlighted, the user would select "Songs" and be presented with a second level listing of menu components. This second level listing could simply be an alphabetical list of all songs available to the user, with each song being a second level menu component. Typically, none of these second level menu components would be pre-packaged, and they would all rely upon the user's particular music preferences. The user would scroll through the songs until "Little Angel of Mine" was highlighted, and then select that menu component to play the song.

Alternatively, if the user wanted to access the song through "Artists," the user would scroll through the top level of menu components until "Artists" was highlighted, and then select "Artists" in order to be presented with the second level of menu components. The user would then scroll through an alphabetical listing of artists until the group "No Secrets" was highlighted. Selecting the "No Secrets" second level menu component would then take the user to a third level of menu components that listed all the songs performed by the group No Secrets. The song "Little Angel of Mine" would then be among the third level menu components.

Yet another alternative method of navigating to the sound would be to access the song through the user-defined playlists. Selecting the top level menu component "Playlists" would bring the user to a second level listing of all the playlists the user had previously created. The song "Little Angel of Mine" might be listed under several different playlists. For example, either the "Stuart Little 2 Soundtrack" or "Songs Written by Orrin Hatch" playlist might contain the song. Selecting either of these second level menu components would bring the user to a third level listing of songs in that playlist.

Each of the described menu components is taken directly from the records 220 and 225. Associated with each menu component is an audio representation of that menu component. In the previous example, "Songs," "Artists," "Playlists," "No Secrets," "Stuart Little 2 Soundtrack," "Songs Written by Orrin Hatch," and "Little Angel of Mine" would all require associated vocalizations to allow a user to navigate the menus without any visual cues.

One mechanism for maintaining the vocalizations is the voiced names database 215. The voiced names database 215 contains an audio file for each vocalization and a number of records 230 that maintain the associations between the audio files and their corresponding menu components. Although alternative mechanisms are possible (e.g., embedding the vocalizations in the song records 220 and playlist records 225, thereby eliminating the need for a voiced names database 215), using a separate voiced names database 215 allows a single vocalization to be used independently of how the user navigates to a particular menu component.

Figure 3:
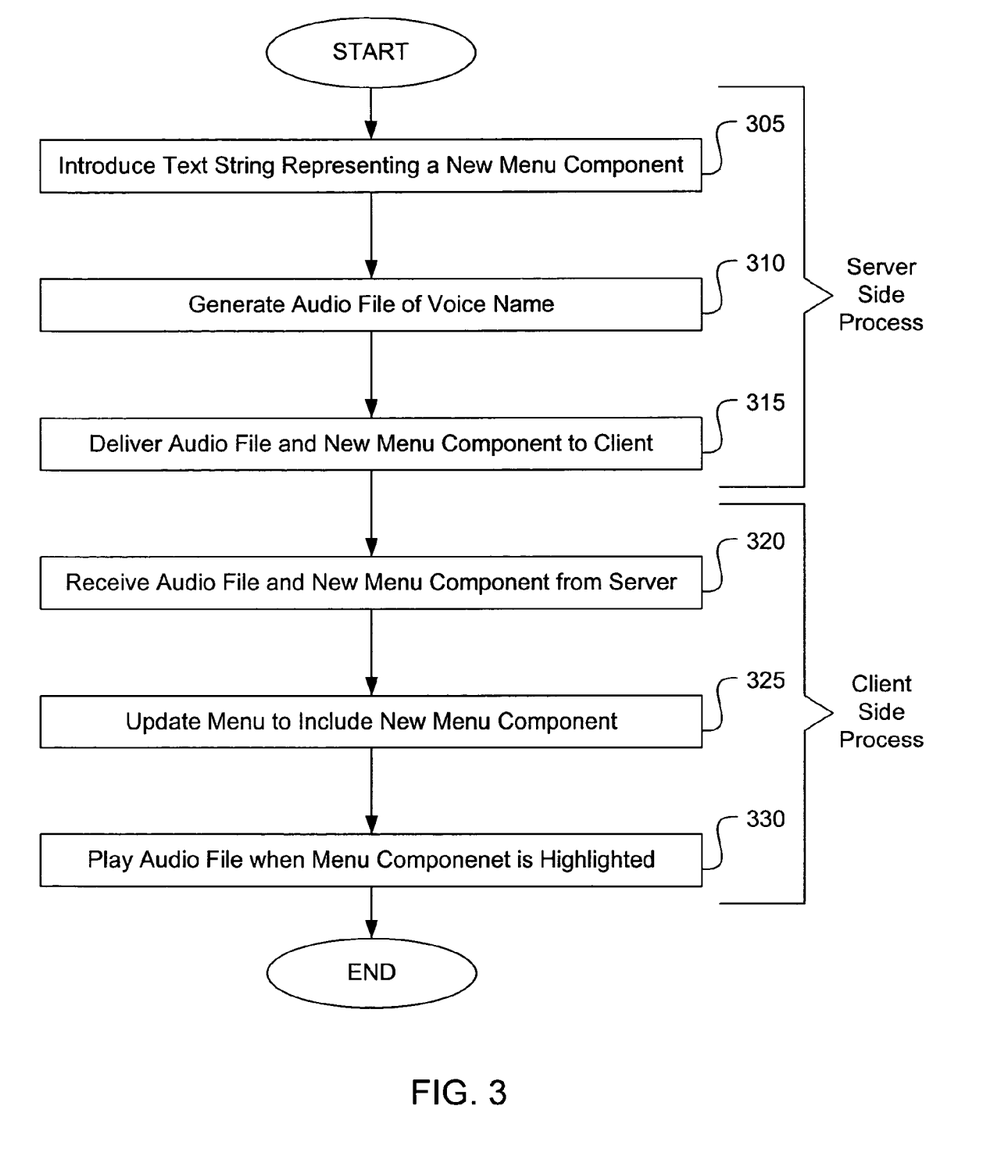
FIG. 3 is a flow chart illustrating the general steps that can be used in connection with one embodiment of the invention.

FIG. 3 is a flow chart illustrating the general steps that can be performed in connection with one embodiment of the invention. At 305 a text string representing a new menu component is introduced to the server 110. This introduction can occur via a user manually entering a new entry, such as a new playlist, or the introduction can occur automatically, such as with the purchase of a new song file that comes packaged with a song record 215.

At 310, if necessary, an audio file is generated that is the voiced name of the menu component. Generation of a voiced name might not be necessary if a purchased song included a voiced name, or if the voiced name already exists in the voiced name database 215. For example, if the user already had a voiced name for "The Beatles" there would not be a need to create a duplicate voiced name every time a new Beatles song was added to the music database 210.

Figure 4:
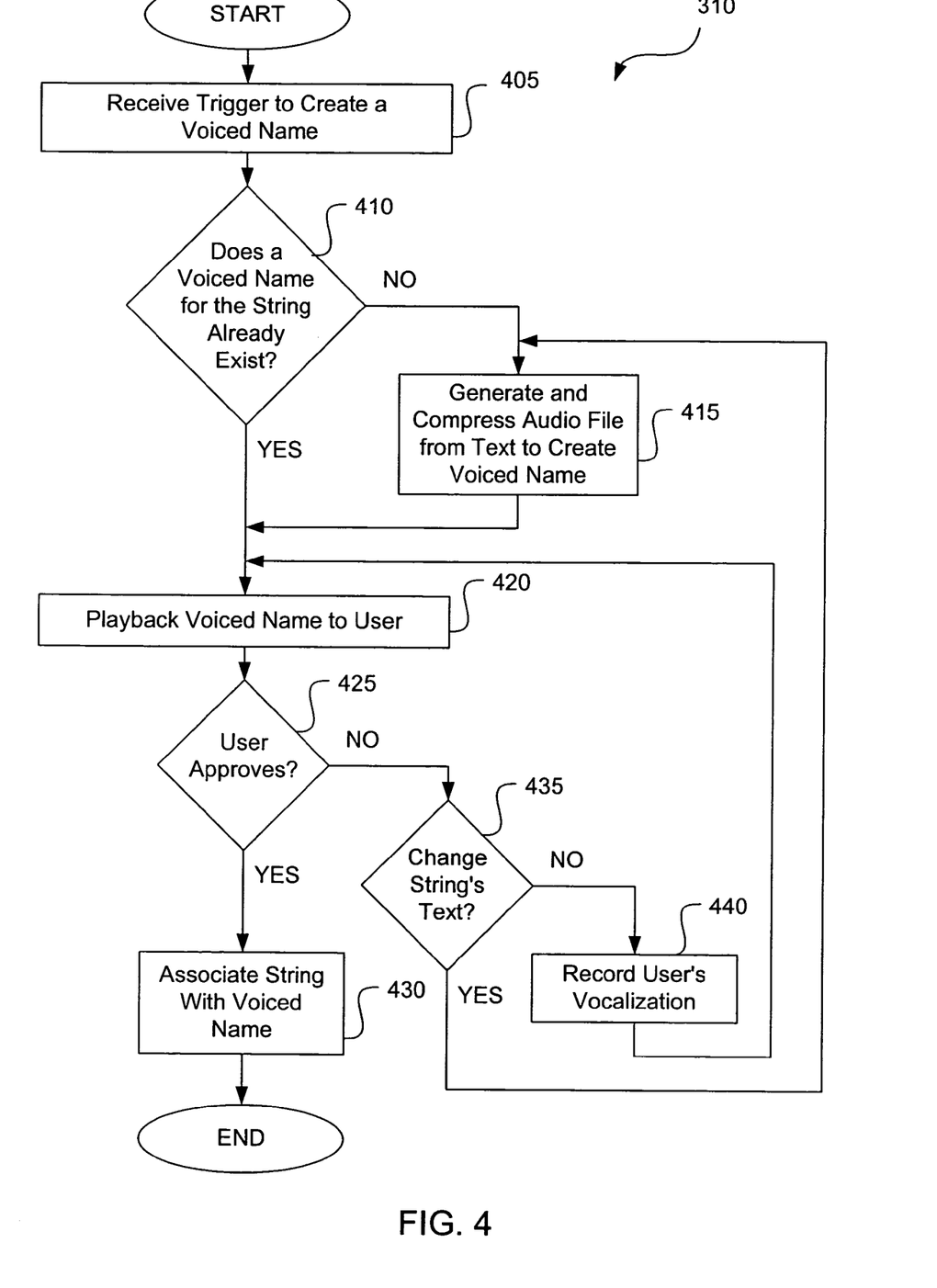
FIG. 4 is a flow chart illustrating one possible method of generating voiced names according to one embodiment of the invention as required in FIG. 3.

FIG. 4 is a flow chart illustrating the detailed steps involved in generating voiced names according to one embodiment of the invention. At 405, the media management system 200 receives a trigger to create a voiced name. Typically, the trigger will be the creation of a new menu component through the introduction of a new song record 220 or a new playlist record 225. However, if the voiced name option was previously turned off, turning the option on for the first time would generate a trigger that informed the media management system 200 that voiced names are required.

Once a trigger is generated, at 410 the media management system 200 determines whether a voiced name for the particular string already exists. If a voiced name does not exist, the server 110 could use standard text-to-speech tools to generate audio files at 415. Preferably, the files will additionally be compressed to save space. One popular codec that both encodes and compresses speech is Qualcomm PureVoice, available from Qualcomm, Inc. of San Diego, Calif.

Once an audio file is created, the server 110 could optionally play the voiced name for the user at 420 so that the user can hear the audio file. At 425 the user can be given the option of approving or rejecting the vocalization. If the user approves of the vocalization, then the media management system 200 will create the appropriate string association record 230 at 430 so that the audio file is associated with the appropriate menu component.

Otherwise, if the user does not approve of the vocalization at 425, the user might be given the option to change the text that the text-to-speech tool uses to create a voiced name at 435. The text that the user inputs could optionally be independent of the menu component, allowing the user to sound out the menu component phonically without altering the actual text that is used in the records 220 and 225, therefore allowing the menu component to be both spelled correctly and pronounced correctly. The new vocalization could then be played back to the user at 420, giving the user the choice to approve of the new vocalization.

Alternatively, if the user chooses not to change the text at 435, the media management system 200 might allow the user to record his or her own vocalization at 440 or possibly provide another audio file. The user's own voice could then be used to later navigate the menus.

Referring back to FIG. 3, after an audio file of a voiced name is created at 310, the server 110 delivers any new files to a client device 115, 120, 125 or 130 at 315. Typically, the contents of the voiced names database 215 and the string association records 230 will be delivered when the user is downloading the music database 210 and their associated records 220 and 225 from the server 110 to the client device 115, 120, 125 or 130. However, there is no reason why the voiced names database 215 and association records 230 could not be delivered independently of the music database 210 and its records 220 and 225.

At 320, the client device 115, 120, 125 or 130 receives the audio files, along with any new menu components as appropriate. Once received, the menus on the client's media management system 200 are updated at 325 to reflect any changes. Then, at 330, whenever the user highlights any menu component, the appropriate audio file is played back to the user, allowing the user to navigate the menu by audio cues.

Figure 5:
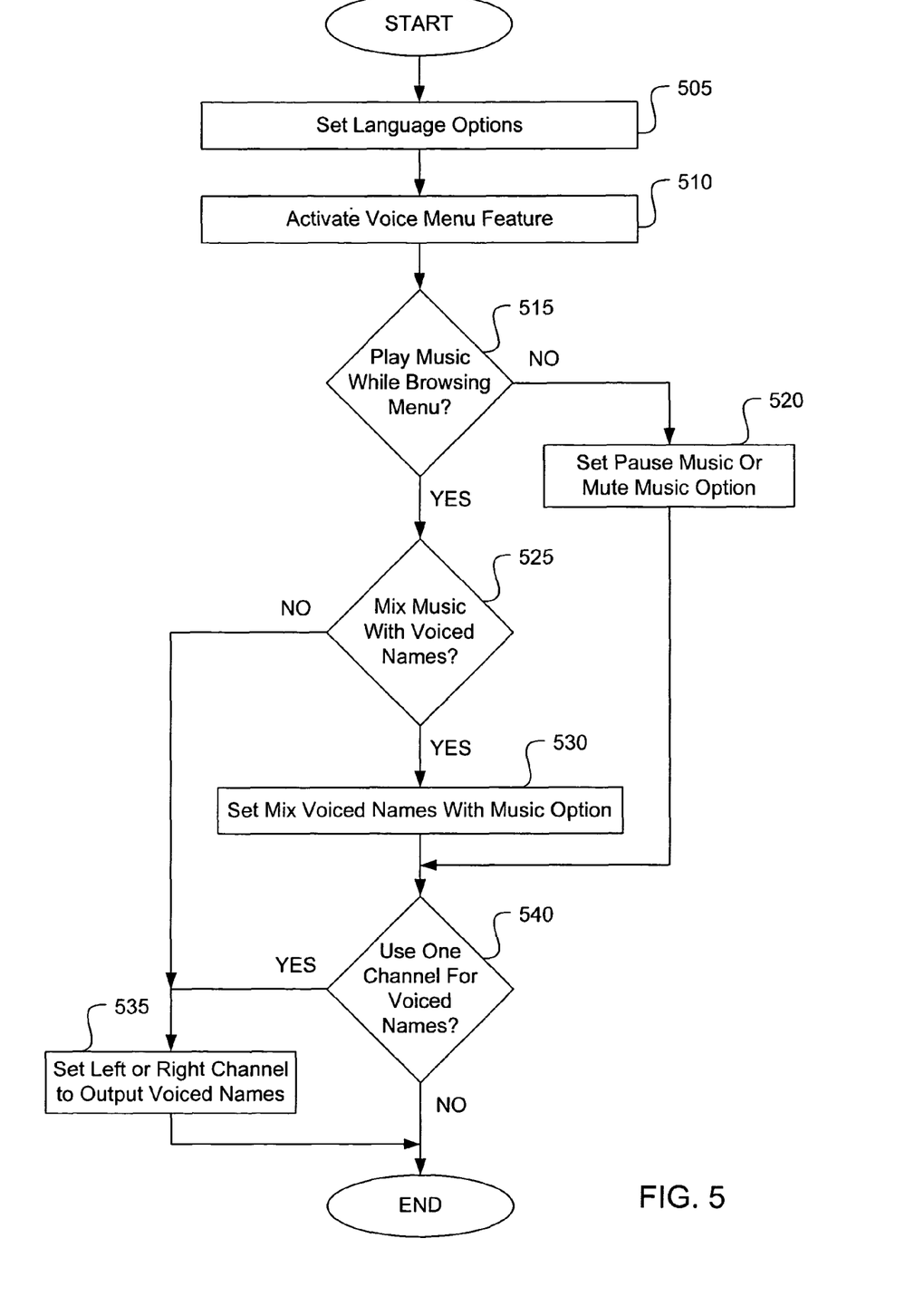
FIG. 5 is a flow chart illustrating the steps that can be performed in activating the audible menu option in a client device according to one embodiment of the invention.

Typically, the media management system 200 will give the user the option of turning on or off the audible menus. FIG. 5 is a flow chart illustrating the steps that can be performed in setting the audible menu option according to one embodiment of the invention. At 505, the user can optionally select a language option. The language option allows the pre-packaged menu components to be presented in other languages. For example, the "Songs" menu component would be presented to the user as "Canciones" in Spanish, "Chansons" in French and "Canzoni" in Italian. Additionally, the English-version voiced name would no longer be appropriate, and could be substituted with an appropriate foreign language vocalization. The foreign language vocalization could either be pre-packaged in the media management system 200, or could require downloading from the server 110. Typically, once language options are set, they will not be changed.

At 510 the user activates the audible menu feature. While this might cause the client device 115, 120, 125, or 130 to use pre-defined settings, it is also possible to present the user with various customization options. For example, at 515, the user can choose to play music while browsing the menu. Once the user selects a song to be played, the user might want to queue up another song while listening to his or her first selection. Accordingly, the user can be given the option of allowing the voiced names to be presented while the first selected song is playing. If the user does not want the music to play during menu navigation, the system can be set up to either pause or mute the music at 520.

If the user wants to hear music while navigating the menus, at 525 the user can be given the option of mixing the music with the voiced names. Mixing is simply done by playing the audio file over the currently playing song. If mixing is desired, the mixing option is set at 530. If mixing is not desired, but the user still wants the music to play while navigating the menus, the media management system 200 could allow the music to play in one channel (either the left or right speaker) and play the voiced name in the remaining channel by setting the single-channel option at 535. Therefore, when the user is wearing headphones, the voiced names would be presented in one ear while the music would be playing without interruption in the other ear. Additionally, even if the user selected the mixing option at 530 or the pause music option at 520, there is no reason why the user could not also select the voiced names to be output in a single channel at 540.

Figure 6:
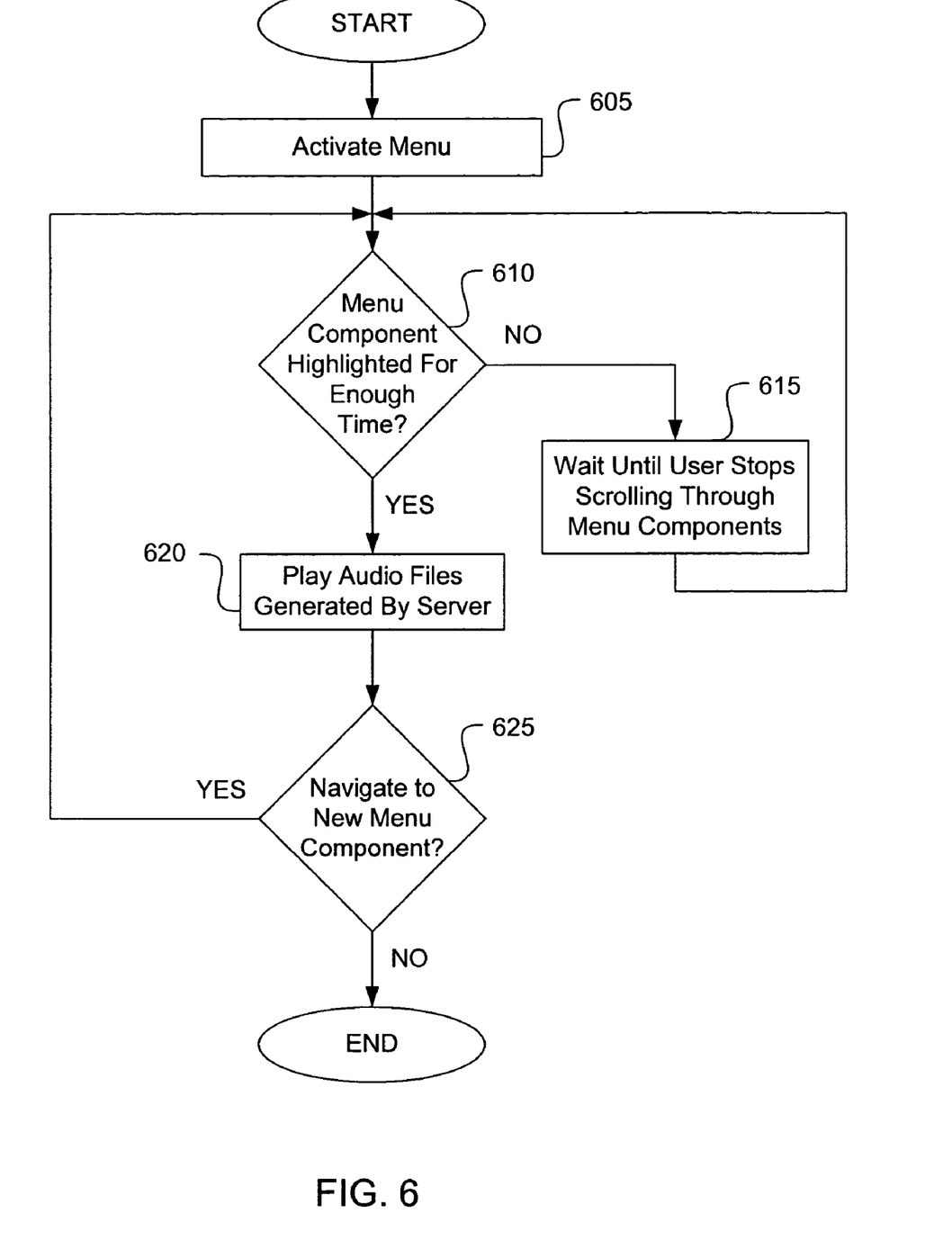
FIG. 6 is a flow chart illustrating the steps that can be performed during menu navigation according to one embodiment of the invention.

Once all the audible menu features are set, the client device 115, 120, 125, or 130 is ready to use the voiced names during menu navigation. FIG. 6 is a flow chart illustrating the steps that can be performed during menu navigation according to one embodiment of the invention.

At 605 the menu is activated. While activation may not be required if the menu is always active, some client devices 115, 120, 125, or 130 might hibernate the menu after periods of inactivity. Typically, the menu is taken out of hibernation by pressing a navigation control. The navigation controls can include dials, buttons, touch screens, or any other convenient input mechanism. The navigation controls could be present on the client device 115, 120, 125, or 130, or through a remote control. It should be appreciated that many remote controls do not have any visual displays, making menu navigation inconvenient if a visual display on the client device 115, 120, 125 or 130 must be used.

Once active, the media management system 200 optionally determines whether the menu component has been highlighted for a sufficient period of time at 610. It might be very distracting for the user to scroll through the menu components and hear the voiced names of each menu component start, only to be cut off by the voiced name of the next menu component, which is then cut off by the voiced name of the next menu component. Preferably, the media management system 200 will have a slight delay so that the user could rapidly scroll through the various options without such a distraction. At 615 the media management system 200 waits until the user stops scrolling through the menu components, and pauses for enough time on a single menu component to permit a voiced name to be played at 620. The period of time does not have to be long, and will typically be no more than a few seconds, and may even be some fraction of a second.

At 625 the user then has the option to navigate to a new menu component and restart the process. Navigation can either be done through scrolling, or, if the currently highlighted menu component leads to another level of menus, through selection of the current menu component. Alternatively, the process can end if the user simply stops navigating the menus, or makes a menu component selection that does not lead to more menu choices (e.g., playing a song).

Generally, the techniques of the present invention may be implemented in software and/or hardware. For example, they can be implemented in an operating system, in a separate user process, in a library package bound into applications, or on a specially constructed machine. In a specific embodiment of this invention, the technique of the present invention is implemented in software such as an operating system and/or in an application program running on the operating system.

A software or software/hardware hybrid implementation of the techniques of this invention may be implemented on a general-purpose programmable machine selectively activated or reconfigured by a computer program stored in memory. In an alternative embodiment, the techniques of this invention may be implemented on a general-purpose network host machine such as a personal computer, workstation or server. Further, the invention may be at least partially implemented on a general-purpose computing device.

Figure 7:
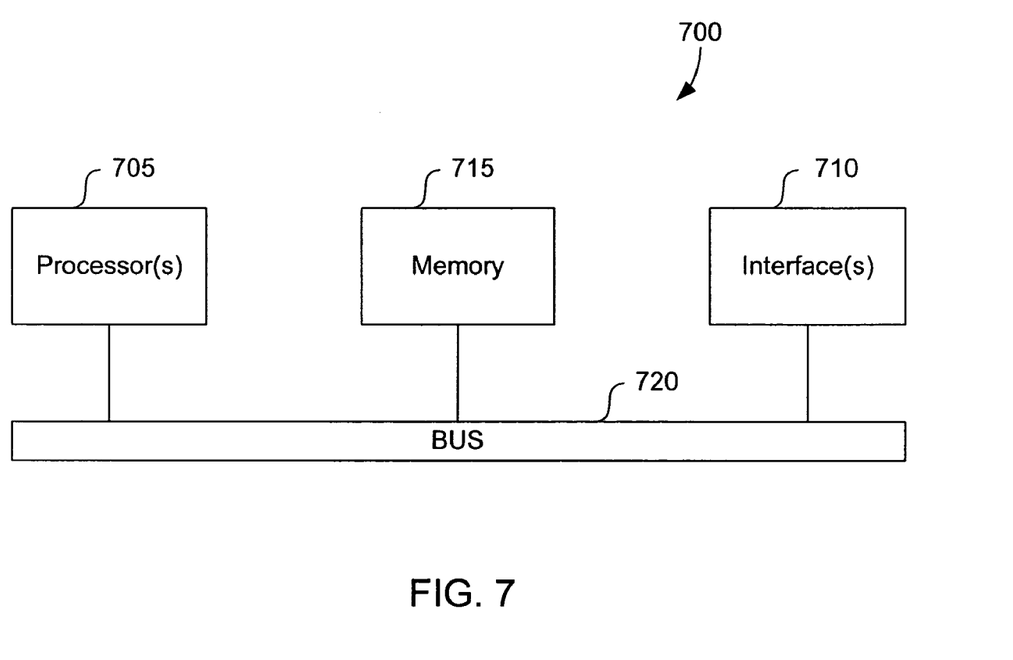
FIG. 7 is a diagram illustrating an exemplary computing device in which various embodiments of the invention may be implemented.

Referring now to FIG. 7, a computing device 700 suitable for implementing the techniques of the present invention includes a master central processing unit (CPU) 705, interfaces 710, memory 715 and a bus 720. When acting under the control of appropriate software or firmware, the CPU 705 may be responsible for implementing specific functions associated with the functions of a desired computing device. The CPU 705 preferably accomplishes all these functions under the control of software including an operating system (e.g., Mac OS X), and any appropriate applications software (e.g., iTunes).

CPU 705 may include one or more processors such as those from the Motorola family of microprocessors or the MIPS family of microprocessors. In an alternative embodiment, the processor is specially designed hardware for controlling the operations of computing device 700.

The interfaces 710 are typically provided as interface cards. Generally, they control the sending and receiving of data packets over the network and sometimes support other peripherals used with the computing device 700. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces, Firewire interfaces, USB interfaces and the like. Generally, these interfaces may include ports appropriate for communication with the appropriate media. In some cases, they may also include an independent processor and, in some instances, volatile RAM.

Regardless of computing device's configuration, it may employ one or more memories or memory modules (such as, for example, the memory 715) configured to store data, program instructions and/or other information relating to the functionality of the techniques described herein. The program instructions may control the operation of an operating system and/or one or more applications, for example.

Because such information and program instructions may be employed to implement the systems/methods described herein, the present invention relates to machine (e.g., computer) readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and higher level code that may be executed by the computer (e.g., using an interpreter).

Although illustrative embodiments and applications of this invention are shown and described herein, many variations and modifications are possible which remain within the concept, scope, and spirit of the invention, and these variations would become clear to those of ordinary skill in the art after perusal of this application. For example, the terms "scroll" and "highlight," when used in the context of menus, are not limited to their literal interpretations. Menu choices can be "scrolled" on a single line, with one menu component replacing the last menu component. Similarly, a menu choice can be "highlighted" even if it is italicized, bolded, or listed with a bullet. Accordingly, the present embodiments are to be considered as illustrative and not restrictive, and the invention is not to be limited to the details given herein, but may be modified within the scope and equivalents of the appended claims.

What is claimed is:

1. A method for providing an audible menu in a portable media device, comprising:

receiving customization settings from a user, wherein the customization settings include an indication of a type of media file to navigate;

presenting a navigable menu on a graphical user interface (GUI) that includes navigation menu icons presented on a visual display;

receiving user input indicating movement to a particular navigation menu icon;

outputting an audible output corresponding to the particular navigation menu icon, wherein content of the audible output is customized based upon the customization settings, such that different indicated types of media files to navigate result in different audible output content corresponding to the same particular navigation menu icon, wherein the outputting only occurs after a predetermined amount of time has elapsed without receipt of user input indicating movement to a different navigation menu icon and without receipt of user input indicating selection of the particular navigation menu icon;

receiving user input indicating selection of the particular navigation menu icon; and executing a specific navigation corresponding to the particular navigation menu icon in response to the receiving of the user input indicating selection of the particular navigation menu icon, wherein the specific navigation command does not include playing a media item.

2. The method of claim 1, wherein the type of media file to navigate is selected from the group consisting of song files, audio book files, podcast files, image files, and video files.

3. The method of claim 1, wherein the customized audible output corresponding to the particular navigation menu icon when a song file is the indicated type of media file to navigate is a different audible output than would be output for the particular navigation menu icon when a video file is the indicated type of media file to navigate.

4. A portable media device lacking a display, the portable media device comprising:

a processor; and a memory configured to store a plurality of media items operably connected with the processor;

wherein the processor is operable to assist a user in selecting at least one of the plurality of stored media items by:

playing a media file from the media database;

providing a navigable hierarchical menu, wherein the hierarchical menu includes a hierarchical level including only navigation items, the navigation items corresponding to drill-down or drill-up commands to different levels of the hierarchical menu;

receiving user input navigating to a first of the navigation items;

while the media file is playing, outputting an audible output corresponding to the first of the navigation items only after the first of the navigation items has been navigated to, without being selected or without another navigation item being navigated to, for a period of time greater than a predetermined amount of time wherein content of the audible output is customized based upon the customization settings, such that different types of media files to navigate result in different audible output content corresponding to the same particular navigation menu icon;

receiving user input selecting the first of the navigation items; and executing a navigation command corresponding to the selected first of the navigation items.

5. The portable media device of claim 4, wherein the hierarchical menu includes another hierarchical level including one or more media items.

6. The portable media device of claim 4, wherein the processor is further operable to:

receive user input selecting a particular one of the stored plurality of media items, the selection not associated with one of the navigation items; and play the particular one of the stored plurality of media items in response to the receipt of the selection.

7. The portable media device of claim 4, further comprising:

a media management system comprising:

a media database that stores media files;

media collection records that include data relating to groupings of the media files;

media records that include metadata relating to the media files;

a voiced name database that stores audio files; and association records that associate the audio files with data from the media collection records and metadata from the media records.

8. The portable media device of claim 4, wherein the media file is played through a left channel while the audible output corresponding to the first of the navigation items is played through a right channel.

9. The portable media device of claim 4, wherein the media file is merged with the audible output corresponding to the first of the navigation items so that both can be played through a single channel simultaneously.

10. The portable media device of claim 4, wherein the client device is in communication with the host device comprising:

a processor; and memory, operably connected with the processor;

wherein the processor is operable to perform instructions including:

providing a text string that represents the first of the navigation items;

generating the audio file from the text string; and delivering the audio file to the portable media device.

11. The portable media device of claim 10, wherein the delivering the audio file to the portable media device occurs when media files are synchronized between the portable media device and the host device.

12. The portable media device of claim 10, wherein the delivering the audio file to the portable media device occurs independently of media files being synchronized between the portable media device and the host device.

13. A method for providing an audible menu, comprising:

presenting a navigable menu on a graphical user interface (GUI) that includes navigation menu icons presented on a visual display, the navigation menu icons each audibly represented by a voiced name to allow a user to navigate the menu when unable to view the visual display, wherein each navigation menu icon corresponds to a specific navigation through the menu and not to the playing of a media item;

receiving user input indicating movement to a particular navigation menu icon;

outputting the voiced name representing the particular navigation menu icon only after a predetermined amount of time has elapsed without receipt of user input indicating movement to a different navigation menu icon and without receipt of user input indicating selection of the particular navigation menu icon, wherein content of the voiced name is customized based upon the customization settings, such that different types of media files to navigate result in different audible output content corresponding to the same particular navigation menu icon;;

receiving user input indicating selection of the particular navigation menu icon; and executing the specific navigation corresponding to the particular navigation menu icon in response to the receiving of the user input indicating selection of the particular navigation menu icon.

14. The method of claim 13, further comprising:

receiving a selection of a particular one of the stored plurality of media items, the selection not associated with one of the navigation icons; and playing the particular one of the stored plurality of media items in response to the receipt of the selection.

15. The method of claim 13, wherein the user is unable to view the visual display because of a medical imparity.

16. The method of claim 13, wherein the user is unable to view the visual display because the user is driving.

17. A method for providing an audible menu, comprising:

receiving customization settings from a user, wherein the customization settings include an indication of a preferred language;

presenting a navigable menu on a graphical user interface (GUI) that includes navigation menu icons presented on a visual display;

receiving user input indicating movement to a particular navigation menu icon;

outputting an audible output corresponding to the particular navigation menu icon, wherein content of the audible output is customized based upon the customization settings, such that different types of media files to navigate result in different audible output content corresponding to the same particular navigation menu icon, wherein the outputting only occurs after a predetermined amount of time has elapsed without receipt of user input indicating movement to a different navigation menu icon and without receipt of user input indicating selection of the particular navigation menu icon;

receiving user input indicating selection of the particular navigation menu icon; and executing a specific navigation corresponding to the particular navigation menu icon in response to the receiving of the user input indicating selection of the particular navigation menu icon, wherein the specific navigation command does not include playing a media item.

18. The method of claim 17, wherein the audible output corresponding to the particular navigation menu icon when a first language is indicated as the preferred language is a different audible output than would be output for the particular navigation menu icon when a second language is indicated as the preferred language.

19. A method for creating audible menu components at a host device, wherein the audible menu navigation components represent navigational components directed to navigation commands, comprising:

providing a text string that represents a vocalization used to audibly describe a menu navigation component, wherein the text string is independent of text of the menu navigation component itself;

generating an audio file from the text string, wherein the audio file includes an indication of a dwell time corresponding to the audio file; and delivering the audio file to a client device, wherein the vocalization is provided only after the menu navigation component has been navigated to but not selected for an amount of time more than the dwell time indicated in the audio file.

20. The method of claim 19, further comprising:
playing the audio file; and
requesting approval of the played audio file prior to delivering the audio file to a client device.

21. The method of claim 19, wherein:
the period of time is user selectable.

22. The method of claim 21, further comprising:
if approval is not given, providing an opportunity to modify the text string; and
if the text string is modified:
replacing the audio file with a previously presented audio file generated from the modified text string;
playing the audio file; and
requesting approval of the played audio file.

23. The method of claim 22, further comprising:
if the text string is not modified, providing an opportunity to replace the audio file with a previously presented audio file generated from an audio recording.

24. The method of claim 23, wherein the indication of the period of time is embedded in the audio files in metadata.

\* \* \* \* \*

UNITED STATES PATENT AND TRADEMARK OFFICE
CERTIFICATE OF CORRECTION

| | | |
|---|---|---|
| PATENT NO. | : 7,757,173 B2 | Page 1 of 1 |
| APPLICATION NO. | : 10/623339 | |
| DATED | : July 13, 2010 | |
| INVENTOR(S) | : Alexander B. Beaman | |

It is certified that error appears in the above-identified patent and that said Letters Patent is hereby corrected as shown below:

On Sheet 3 of 7, in Figure 3, Box no. 330, line 1, delete "Componenet" and insert -- Component --, therefor.

In column 10, line 53, in Claim 13, delete "icon;;" and insert -- icon; --, therefor.

In column 12, line 27, in Claim 22, delete "previously presented" and insert -- new --, therefor.

In column 12, line 33, in Claim 23, delete "previously presented" and insert -- new --, therefor.

Signed and Sealed this
Eighth Day of November, 2011

David J. Kappos
*Director of the United States Patent and Trademark Office*